US011209603B2

(12) United States Patent
Erasmus et al.

(10) Patent No.: US 11,209,603 B2
(45) Date of Patent: Dec. 28, 2021

(54) SMART POLE ASSEMBLY CONNECTIVITY

(71) Applicant: COMMSCOPE TECHNOLOGIES LLC, Hickory, NC (US)

(72) Inventors: Morné Erasmus, Allen, TX (US); Rudy Musschebroeck, Wemmel (BE)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/647,453

(22) PCT Filed: Sep. 14, 2018

(86) PCT No.: PCT/US2018/051127
§ 371 (c)(1),
(2) Date: Mar. 13, 2020

(87) PCT Pub. No.: WO2019/055811
PCT Pub. Date: Mar. 21, 2019

(65) Prior Publication Data
US 2020/0218022 A1 Jul. 9, 2020

Related U.S. Application Data

(60) Provisional application No. 62/559,283, filed on Sep. 15, 2017.

(51) Int. Cl.
*G02B 6/44* (2006.01)
*G02B 6/50* (2006.01)
(Continued)

(52) U.S. Cl.
CPC ......... *G02B 6/4416* (2013.01); *G02B 6/4472* (2013.01); *G02B 6/50* (2013.01);
(Continued)

(58) Field of Classification Search
CPC ...... G02B 6/4416; G02B 6/4472; G02B 6/50; H01Q 1/1242; H01Q 1/44; H04B 10/25
See application file for complete search history.

(56) References Cited

U.S. PATENT DOCUMENTS 5,963,178 A   10/1999   Jones
9,348,096 B2   5/2016   Kmit et al.
(Continued)

FOREIGN PATENT DOCUMENTS

KR   10-2007-0093304 A   9/2007
WO      2016071810 A1   5/2016

OTHER PUBLICATIONS

International Search Report and Written Opinion of the International Searching Authority for International Patent Application No. PCT/US2018/051127 dated Jan. 4, 2019, 10 pages.
(Continued)

*Primary Examiner* — Seung H Lee
(74) *Attorney, Agent, or Firm* — Myers Bigel, P.A.

(57) ABSTRACT

In one aspect of the disclosure a communications network or topology is presented that includes one or more modular or adaptable smart pole assemblies. Each smart pole assembly can include a pole structure supporting a data-communications module and having a hollow interior through which a connectorized vertical cabling structure extends. Jumper cables can be provided to connect components associated with the data-communications module with the vertical cabling structure such that no cabling or wiring has to be removed or installed from the pole hollow interior when components are added, removed, or replaced. The vertical
(Continued)

cabling structure or harness can include one or more of connectorized fiber optic cables, DC power cables, and connectorized Category 6 cables. In one example, the fiber optic cables are terminated with hardened multi-fiber optical connectors at each end.

20 Claims, 10 Drawing Sheets

(51) Int. Cl.
    *H04B 10/25*     (2013.01)
    *H01Q 1/44*     (2006.01)
    *H01Q 1/12*     (2006.01)

(52) U.S. Cl.
    CPC ............ *H01Q 1/1242* (2013.01); *H01Q 1/44* (2013.01); *H04B 10/25* (2013.01)

(56) References Cited

U.S. PATENT DOCUMENTS

| | | | |
|---|---|---|---|
| 10,247,406 B2 * | 4/2019 | Abbott | .................... H01Q 1/44 |
| 2006/0291575 A1 | 12/2006 | Berkman et al. | |
| 2010/0033399 A1 | 2/2010 | Halkiopoulos | |
| 2013/0186039 A1 | 7/2013 | Ceko | |
| 2015/0055954 A1 | 2/2015 | Gronvall et al. | |
| 2015/0349399 A1 | 12/2015 | Lasier et al. | |
| 2016/0018074 A1 * | 1/2016 | Diamond | ............ F21V 23/0464 |
| | | | 362/183 |
| 2017/0122546 A1 | 5/2017 | Abbott | |
| 2017/0176690 A1 | 6/2017 | Bretz et al. | |
| 2018/0172243 A1 * | 6/2018 | Clynne | ................. H04W 84/18 |
| 2018/0277923 A1 * | 9/2018 | Kang | ................... H01Q 1/1228 |

OTHER PUBLICATIONS

"Extended European Search Report corresponding to European Application No. 18856141.9 dated Apr. 29, 2021".

* cited by examiner

SMART POLE ASSEMBLY CONNECTIVITY

CROSS-REFERENCE TO RELATED APPLICATION

This application is a National Stage Application of PCT/US2018/051127, filed on Sep. 14, 2018, which claims the benefit of U.S. Patent Application Ser. No. 62/559,283, filed on Sep. 15, 2017, the disclosures of which are incorporated herein by reference in their entireties. To the extent appropriate, a claim of priority is made to each of the above disclosed applications.

BACKGROUND

In recent years, the telecommunications industry has experienced rapid growth by offering a variety of new and improved services to customers. This growth has been particularly notable in the area of wireless communications, e.g., cellular, personal communication services (PCS) and other mobile radio systems. The technology is continually evolving as consumer needs change and new ideas are developed. As new wireless technologies are developed, companies must invest large amounts of time and resources to upgrade all their existing hardware so that it is compatible with the new technology. Often a change in one component of a system requires time and labor intensive removal and installation of component-specific cabling. In this ever changing environment, system design flexibility is a significant advantage.

SUMMARY

In one aspect of the disclosure a smart pole assembly network or topology is presented. The network or topology can include a plurality of interconnected smart pole assemblies.

In some examples, one or more of the smart pole assemblies can include a pole structure having a hollow interior and a light fixture supported by the pole structure.

In some examples, the smart pole assemblies can also include a vertical cabling structure extending through the hollow interior of the pole structure, wherein the cabling structure is connectorized at each end.

In some examples, the smart pole assemblies can also include a data-communications module supported by the pole structure and receiving the at least one vertical cabling structure.

In some examples, the smart pole assembly network or topology can include a fiber backhaul to which the vertical cabling structures of each of the plurality of smart poles is connected.

In some examples, the data-communications module includes a metro cell radio/antenna station.

In some examples, the network or topology can include an AC to DC rectifier connected to power cabling of the vertical cabling structure of each smart pole assembly.

In some examples, the vertical cabling structure or harness can include one or more of connectorized fiber optic cables, DC power cables, and connectorized Category 6 cables.

In some examples, fiber optic cables are terminated with hardened multi-fiber optical connectors at each end.

In one example, the smart poll assembly includes a pole structure having a hollow interior, a light fixture supported by the pole structure, and at least one vertical cabling structure extending through the hollow interior of the pole structure, a data-communications module supported by the pole structure and receiving the at least one vertical cabling structure, wherein the at least one cabling structure is connectorized at each end and including at least one connectorized fiber optic cable and at least one connectorized DC power cable, and wherein the data-communications module includes one or both of a metro cell and a wireless transceiver. As with other examples, the fiber optic cables can be terminated with hardened multi-fiber optical connectors at each end. As with other examples, the smart pole assembly can include at least one connectorized jumper cable removably connecting one or both of the metro cell and wireless transceiver with the at least one vertical cabling structure. As with other examples, the vertical cabling structure can include a connectorized Category 6 cable.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
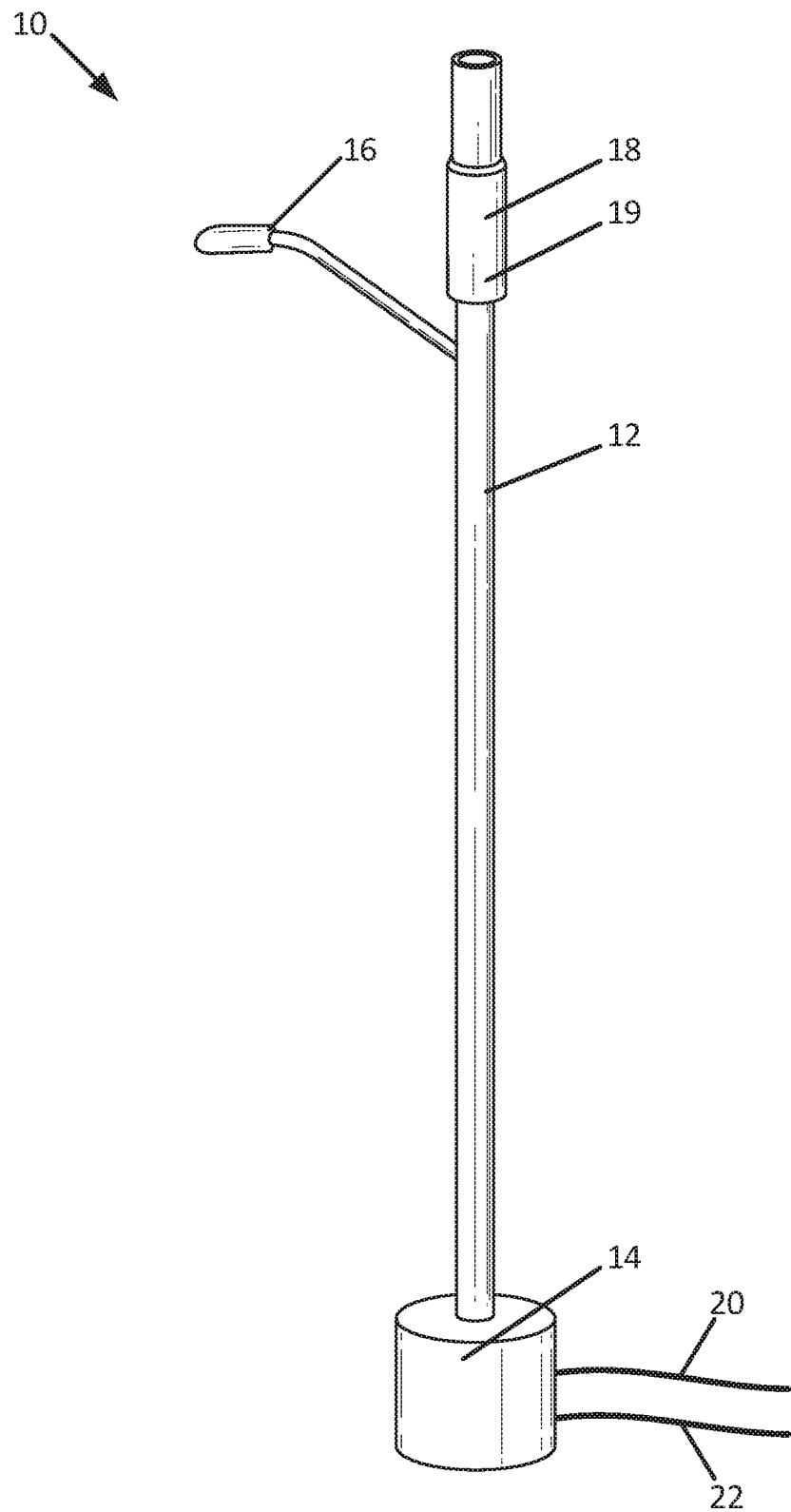
FIG. 1 is a schematic representation of a smart pole assembly having features in accordance with the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Referring to FIG. 1, a smart pole assembly 10 is shown. In one aspect, the smart pole assembly 10 can include a pole structure 12 having a hollow interior supported by a base 14. A lamp or light fixture 16 can be supported by the pole structure 12 and can be powered by a power line 20 extending through the base 14 and pole structure 12.

Figure 3:
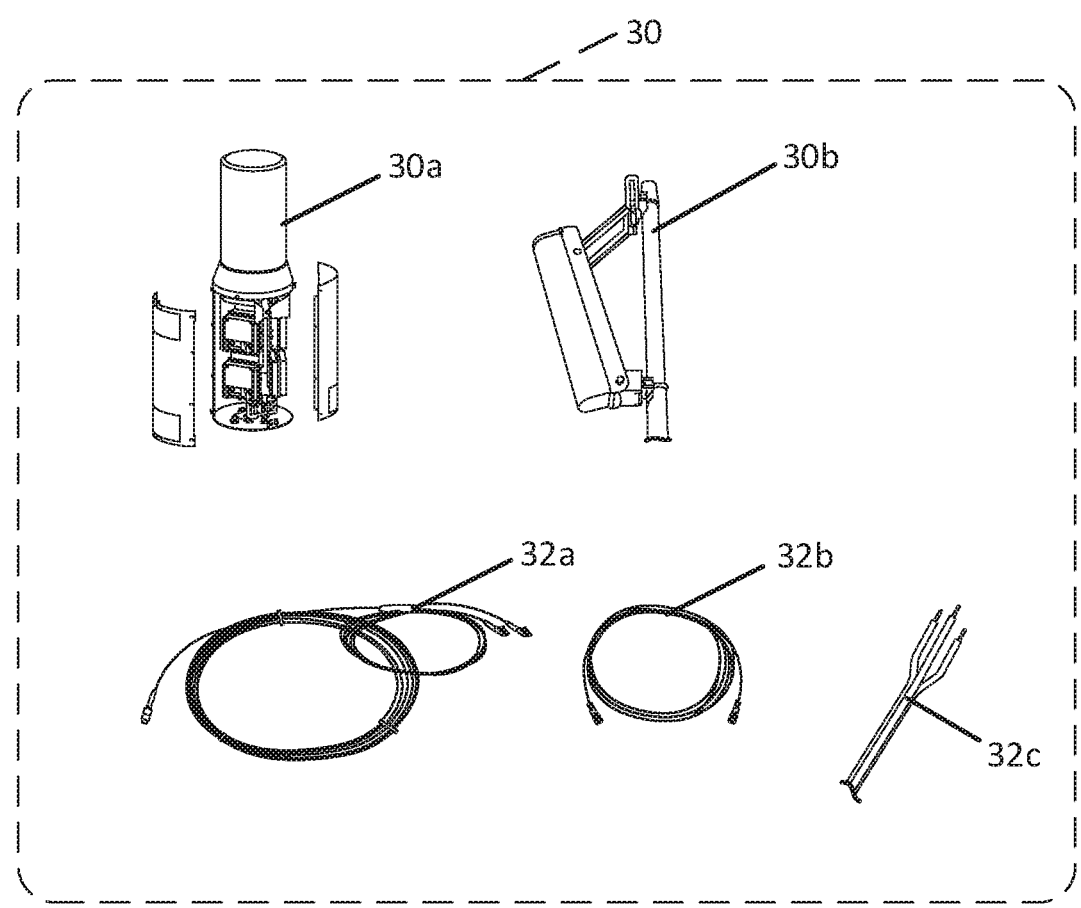
FIG. 3 is a schematic representation of examples of equipment and jumpers to equipment which can be provided with the smart pole assembly of FIG. 1.

The smart pole assembly 10 can also be provided with a communications module 18 supported by the pole structure 12. The data-communications module 18, which can be provided with an enclosure 19, can be provided to support and/or house a variety of data-communications equipment components 30. For example, the data-communications module 18 can be provided with a metro cell mobile phone station 30a including one or more radio heads and antennas, a wireless transceiver 30b, a photo-cell for sensing ambient light conditions, speakers, microphones, cameras, RFID sensors, a back-up battery system, and/or photovoltaic systems. Some examples are shown at FIG. 3. U.S. Pat. No. 9,106,981 entitled Aggregation enclosure for elevated outdoor conditions and issued on Aug. 11, 2015, also includes examples of data-communications components and systems, the entirety of which is incorporated by reference herein. Many other possibilities exist, depending upon the desired application and location of a particular smart pole assembly 10.

Figure 2:
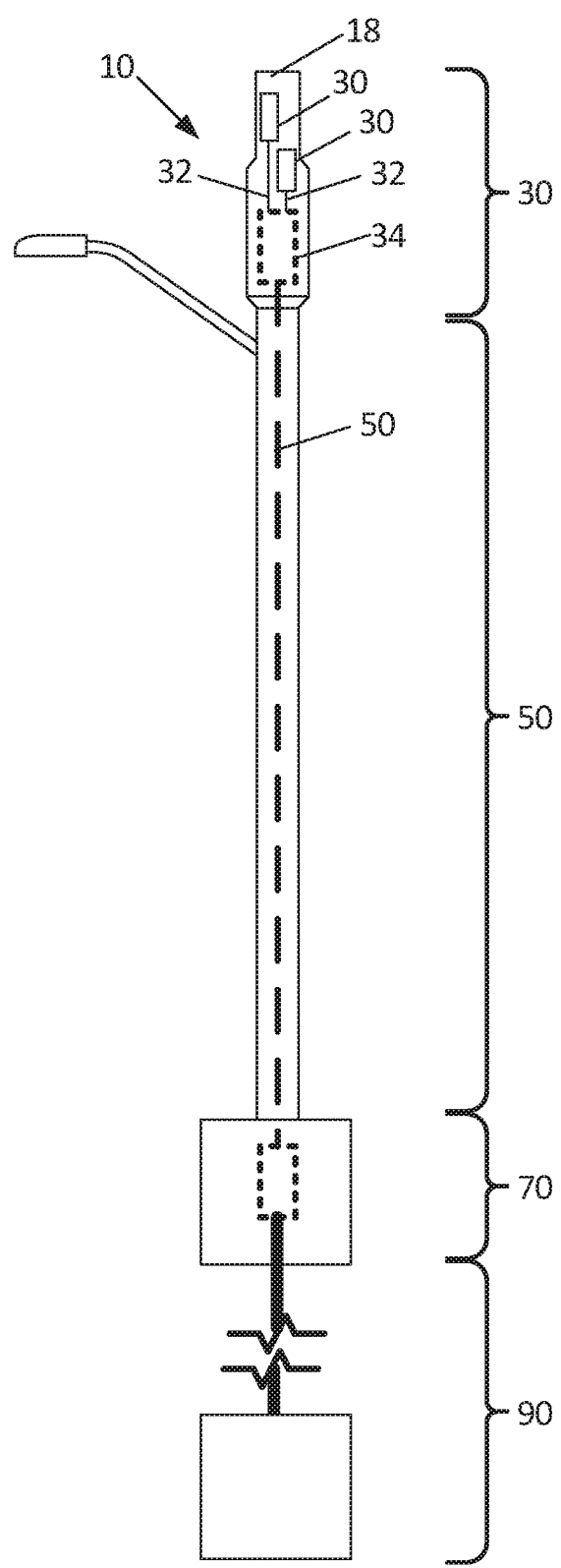
FIG. 2 is a schematic representation of the smart pole assembly shown in FIG. 1, additionally showing components of the smart pole assembly and additional connectivity features.

Due to the wide variety and combinations of potential components that could be associated with the data-communications module 18, it is desirable to have a system which is adaptable such that a plug and play environment exists for connections between the components and the cabling within the pole structure 12. Such flexibility allows for components to be easily installed onto a pole without requiring a new run of cable through the entire pole structure 12. Also, such an arrangement avoids needing to remove existing cabling associated with a removed component through the pole structure 12. The disclosed system is flexible in all of the aforementioned ways. To this end, and as shown at FIGS. 2 3, the data-communications module 18 may be provided with quick-disconnect jumper cabling 32 for connection with the components associated with the data-communications assembly 18. For example, a fan-out harness 32a can be provided with multiple ruggedized or hardened connectors, for example multiple hardened multi-fiber optical connectors (HMFOC) can be provided for connection with the adapters of multiple components 30. An example of an HMFOC-type connection is shown and described in U.S. Pat. No. 9,348,096 entitled Passive Distribution System using Fiber Indexing and issued on May 24, 2016, the entirety of which is incorporated herein by reference. One or more Category 6 (CAT6) power over Ethernet (POE) jumper cables 32b can also be provided. AC and/or DC power jumper cabling 32c can also be provided for powering the components 30.

Figure 4:
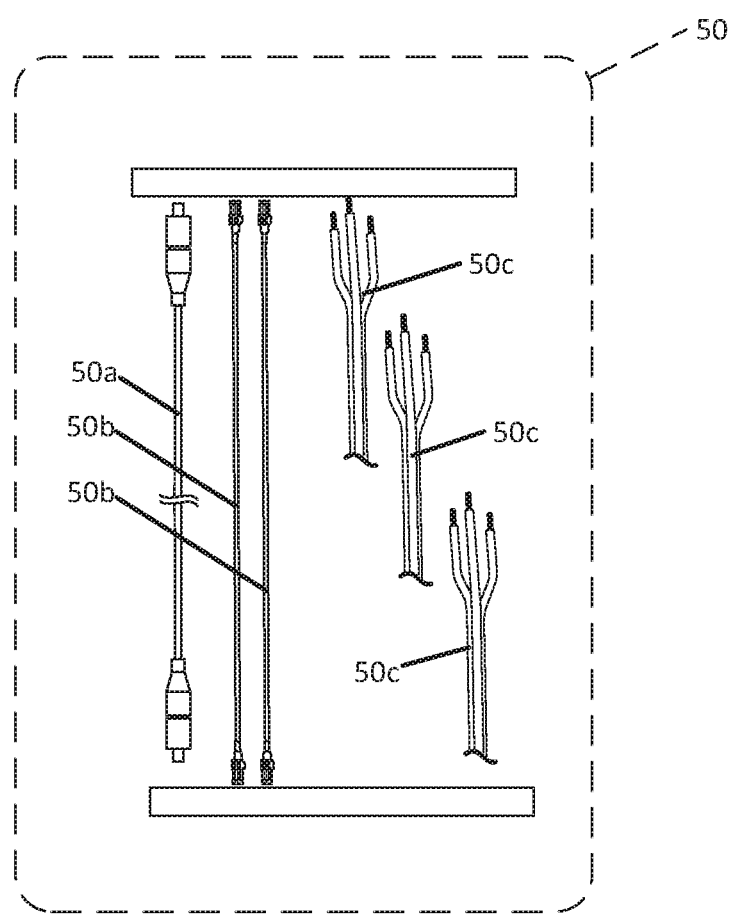
FIG. 4 is a schematic representation of examples of vertical connectivity components which can be provided with the smart pole assembly of FIG. 1.

Referring to FIGS. 2 and 4, the jumper cabling 32 can be connected to vertical connectivity cabling structures or harnesses 50 which are routed through the pole structure 12. For example, a cable 50a can be provided with fiber optic cables with hardened multi-fiber optical connectors (HMFOC) at each end. As such, the cabling structures 50 can be characterized as being connectorized at both ends. One or more Category 6 (Cat 6) power over Ethernet (POE) cables 50b can also be provided, for example a cable including a plurality of copper-based twisted-pair cables. AC and/or DC power cabling 50c can also be provided. In the particular example shown at FIG. 4, a 12 fiber HMFOC cable 50a, two CAT6 cables, and three DC power cables 50c are provided and routed through the pole structure 12 and connected to the associated jumper cables 32. With such a configuration, the cabling structures 50 can remain in place when components 30 are added, removed, and/or replaced since the required jumper cables 32 can be likewise added, removed, and/or replaced instead of the entire cabling run from the base 14 to the data-communications module. However, it should be understood that cabling can be added, removed, and/or replaced within the hollow interior of the pole structure 12 at any time, if desired.

In one aspect, the data-communications module 18 or the pole structure 12 can include an organized connectivity box 34, panel, or enclosure receiving the jumper cabling 32 and the vertical cabling structures 50 such that they can be interconnected. Where the jumper cabling 32 and vertical cabling structures 50 include optical fibers, the organized connectivity box 34 can include an adapter arrangement including one or more adapters into which the connectorized optical fibers of the jumper cabling 32 and vertical cabling structures 50 can be received. The organized connectivity box 34 can also include strain relief features such that the weight of the vertical cabling structures 50 does not exert stress onto the connections with the jumper cabling 32.

Figure 5:
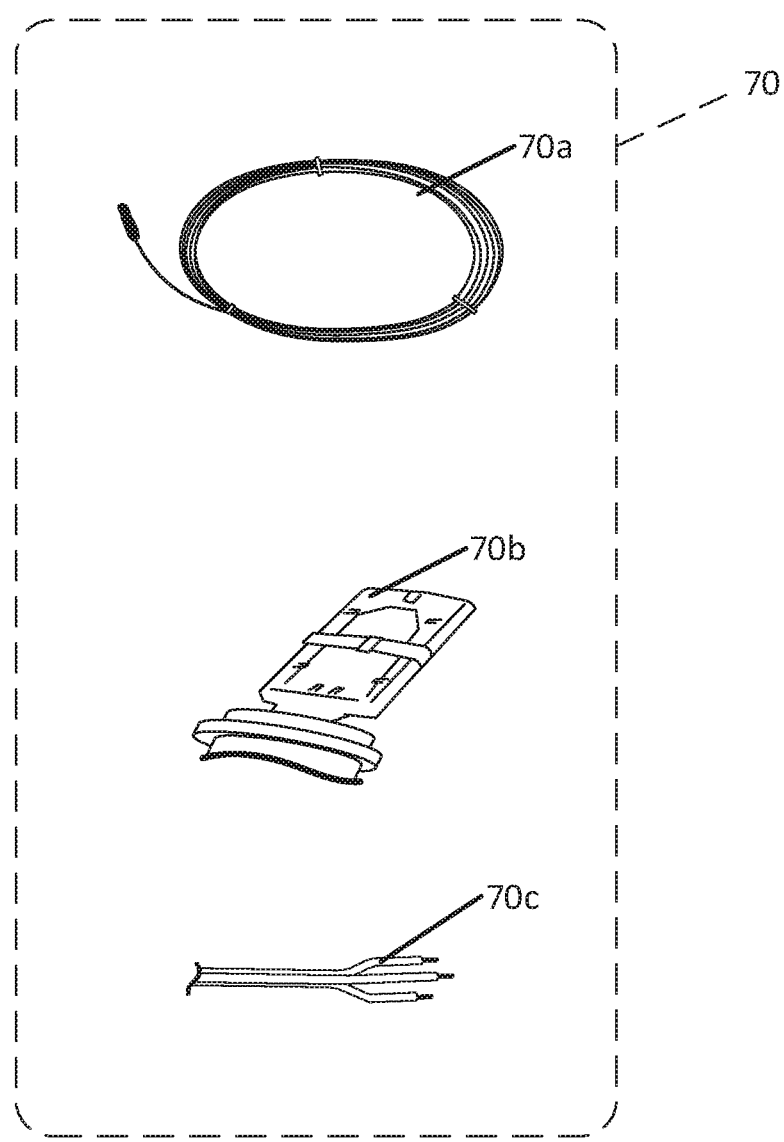
FIG. 5 is a schematic representation of a first example of connectivity components which can be provided at the base of the smart pole assembly of FIG. 1.
Figure 5A:
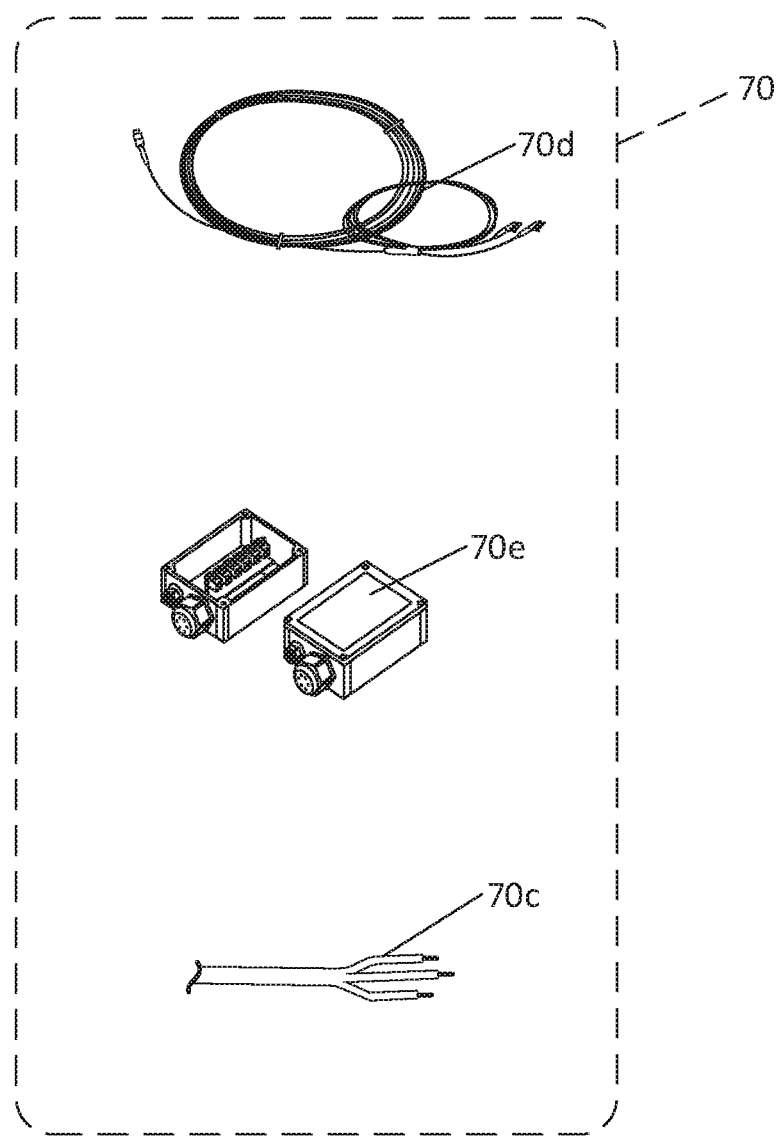
FIG. 5A is a schematic representation of a second example of connectivity components which can be provided at the base of the smart pole assembly of FIG. 1.
Figure 5B:
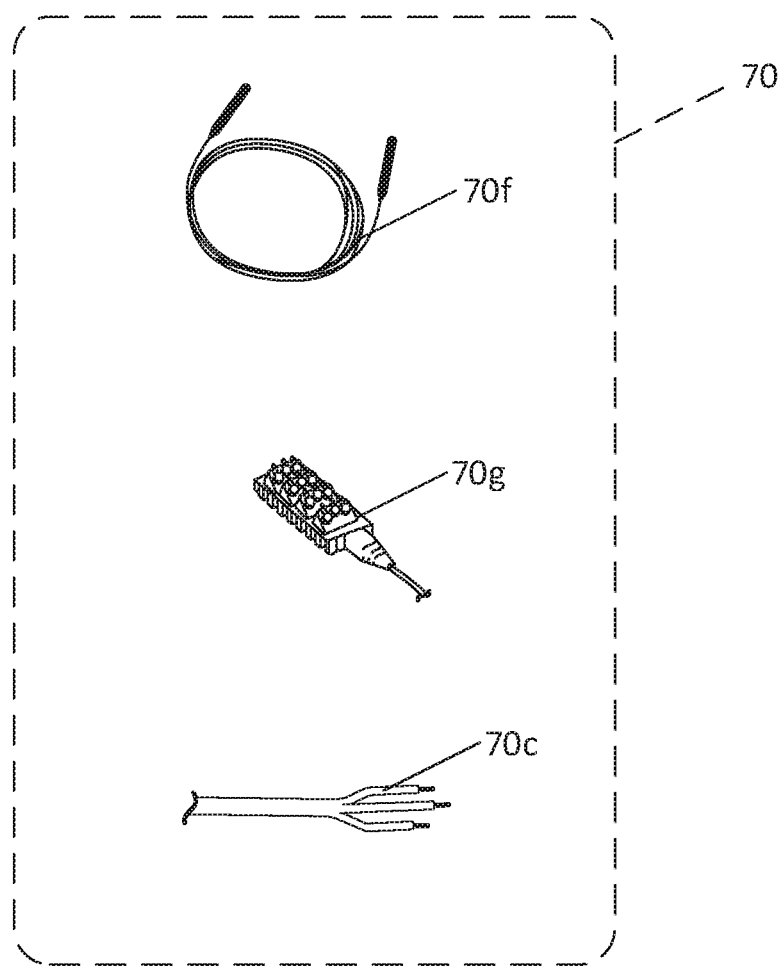
FIG. 5B is a schematic representation of a second example of connectivity components which can be provided at the base of the smart pole assembly of FIG. 1.

Referring to FIGS. 5-5B, the base 14 can be additionally provided with base connectivity cabling and equipment 70 for connection with the connectivity structures 50. In the example shown at FIG. 5, a HMFOC fiber splice cable 70a, a splice closure 70b, and power supply cabling 70c are provided. In the example shown at FIG. 5A, HMFOC fanout cabling 70d, a demarcation box 70e, and power supply cabling 70c are provided. In the example shown at FIG. 5B, a HMFOC hardened fanout 70f, a hardened pretermination box 70g, and power supply cabling 70c are provided. The modularity of the base cabling and equipment 70 allows for the cabling and equipment 70a-70g to be easily installed, removed, and/or replaced without requiring replacement of the vertical cabling structures 50.

Figure 6:
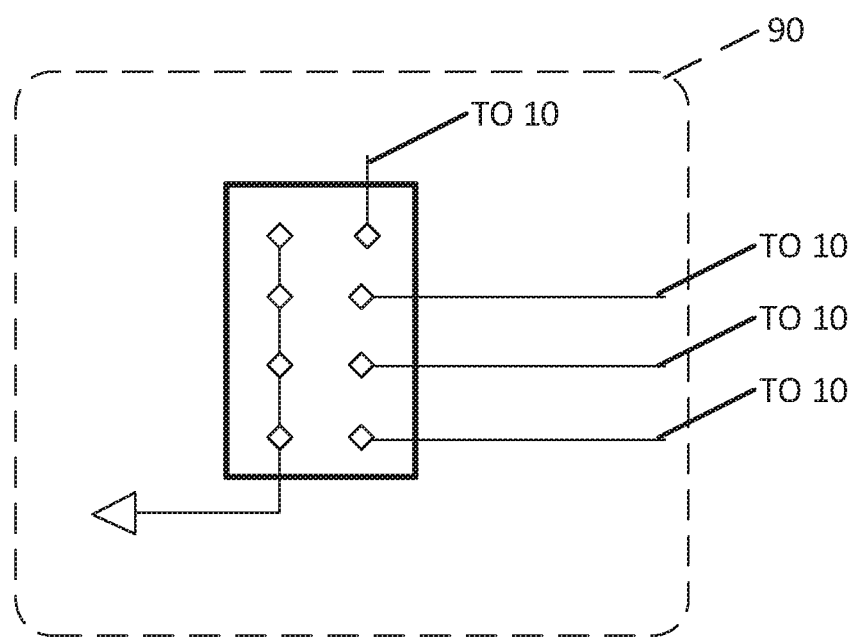
FIG. 6 is a schematic representation of a fiber backhaul arrangement that can be provided to connect with a plurality of the smart pole assemblies shown in FIG. 1.

In some examples, the splice closure 70b, demarcation box 70e, and/or the hardened pretermination box can be housed in a separate substructure from the base 14, such as a vault or a stand-alone enclosure, and can function as a fiber backhaul 90, as shown in FIG. 6. In such a configuration, the power cabling 70c can also be fed through the substructure that houses the fiber backhaul 90. In one example, the substructure can also include a battery back-up for providing power to the connected light pole assemblies 10.

Figure 7:
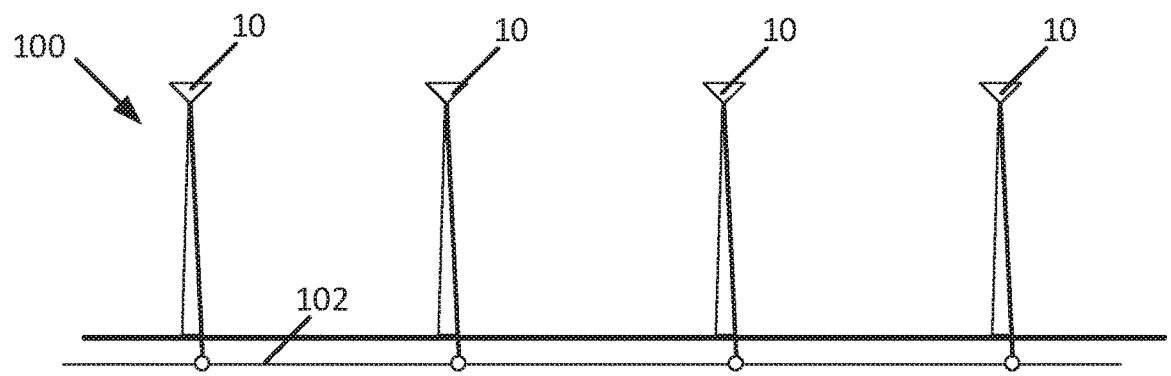
FIG. 7 is a schematic representation of a first topology arrangement utilizing a plurality of the smart pole assemblies shown in FIG. 1.

Referring to FIG. 7, a schematic representation of a first topology arrangement 100 utilizing a plurality of smart pole assemblies 10 is presented. In this configuration, the smart pole assemblies 10 are installed with traditional street light wiring 102 where AC power is fed and controlled from a central point. One or more of the smart pole assemblies 10 are each provided with a vertical connectivity cabling structure 50 such that the smart pole assemblies 10 are ready for installation of any desired data-communications equipment 30 at a later time.

Figure 8:
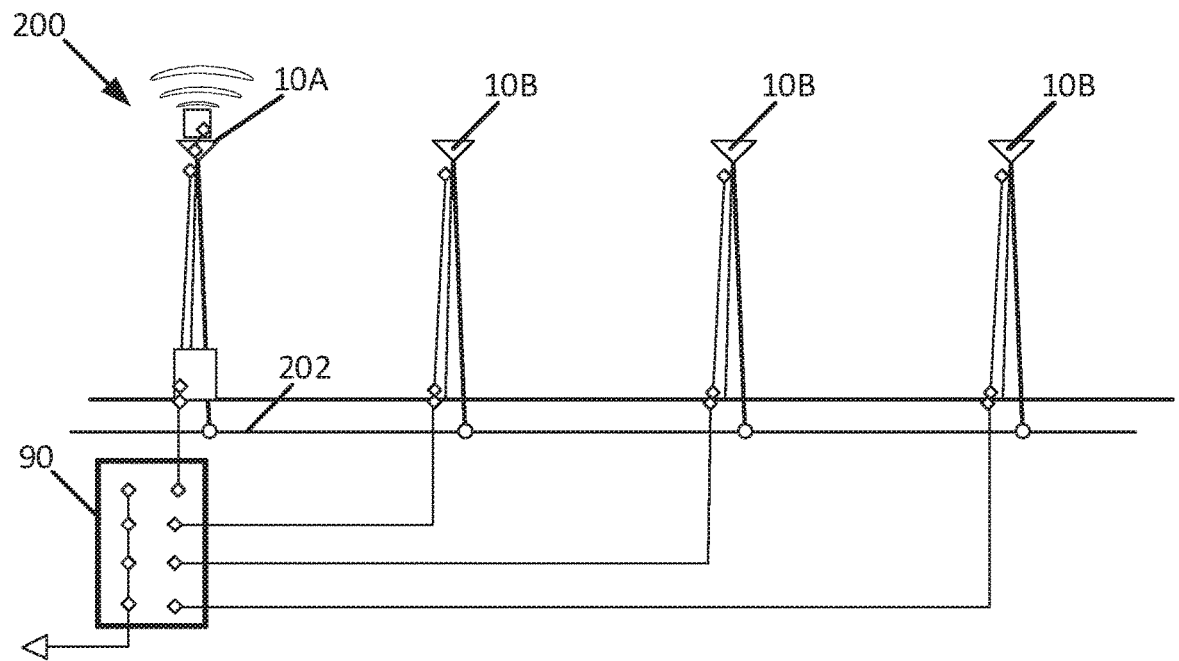
FIG. 8 is a schematic representation of a second topology arrangement utilizing a plurality of the smart pole assemblies shown in FIG. 1.

Referring to FIG. 8, a schematic representation of a second topology arrangement 200 utilizing a plurality of smart pole assemblies 10 is presented. In this configuration, a master smart pole assembly 10A is installed along with one or more standard smart pole assemblies 10B. Each of the smart pole assemblies 10 (i.e. 10A and 10B) is configured with traditional street light wiring 202 where AC power is fed and controlled from a central point. The master smart pole assembly 10A is provided with metro cell equipment 30A equipment and a fiber fanout or splitter 32A inside or adjacent. Each smart pole assembly 10B also has a vertical connectivity cabling structure 50 inside the pole 12 making the poles 10B "smart" ready. Thus in the future, the incumbent only needs to work on the top of the pole 12 and the fanout or splitter 32A at the master pole 10A to provide connectivity between the smart pole assemblies 10A, 10B. This work can be accomplished by a single installer which is an advantage over poles of the type where cabling must be entirely installed, removed, and/or replaced through the pole structure 12 which generally requires two installers with a fish tape. The exact count of vertical fibers within the vertical connectivity cabling structure 50 can be provided to handle a predetermined number of connections. For example, the vertical connectivity cabling structures 50 can be provided with at least twelve fibers per cable. Twenty four fibers per cable is also possible.

Figure 9:
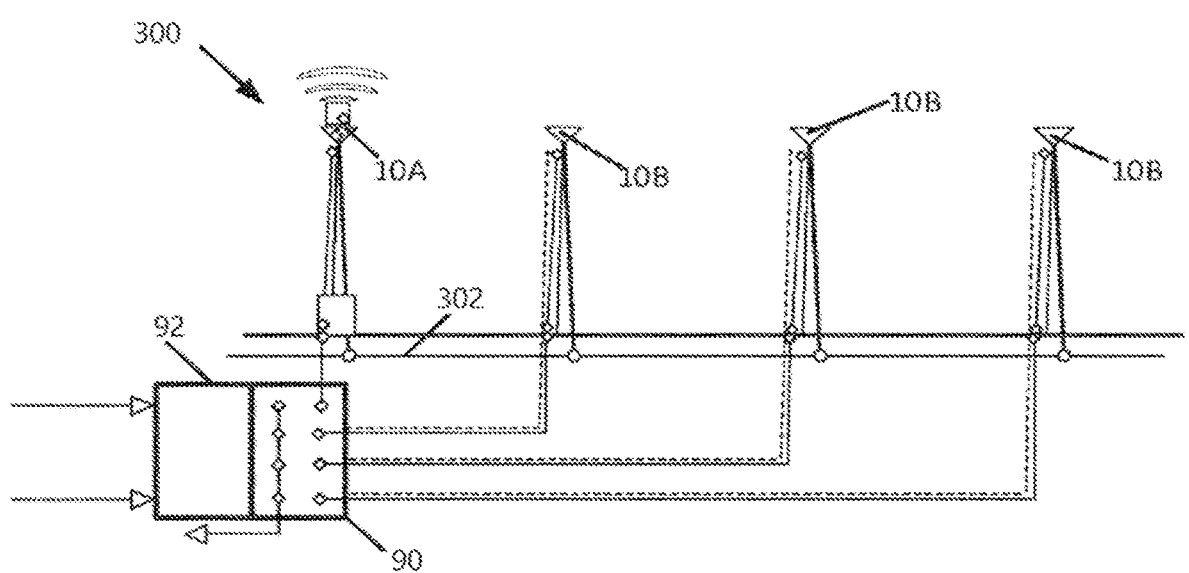
FIG. 9 is a schematic representation of a third topology arrangement utilizing a plurality of the smart pole assemblies shown in FIG. 1.

Referring to FIG. 9, a schematic representation of a third topology arrangement 300 utilizing a plurality of smart pole assemblies 10 is presented. Similarly to the arrangement shown at FIG. 8, the third topology arrangement 300 includes a master smart pole assembly 10A is installed along with one or more standard smart pole assemblies 10B. However, the third topology arrangement 300 additionally includes an AC to DC power converter or rectifier 92 at the fiber backhaul 90 that is connected to the AC power feed 302. The rectifier 92 is connected to the backhaul 90 which then feeds DC power to each smart pole assembly 10A, 10B via power supply cabling 70c. Power supply cabling 70c is connected to power supply cabling 50c and power jumper cabling 32c, as described above. The current power feed from the rectifier 92 can be 48 VDC, power over ethernet (POE) power, or both. In one example, the master smart pole assembly 10A can house the backhaul fiber splitters and power unit/rectifier 92 inside or adjacent to the master pole, for example within the base 14. These components could also be remotely located, such as in a vault or separate enclosure. The power rectifier 92 can also include provisions for a backup power source (like batteries).

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

| PARTS LIST | |
|---|---|
| 6 | category |
| 10 | smart pole assembly |
| 10A | master smart pole assembly |
| 10B | standard smart pole assembly |
| 12 | pole structure |
| 14 | base |
| 16 | light fixture |
| 18 | communications module |
| 19 | enclosure |
| 20 | power line |
| 30 | data-communications equipment components |

| PARTS LIST | |
|---|---|
| 30A | metro cell equipment |
| 30b | wireless transceiver |
| 32 | quick-disconnect jumper cabling |
| 32A | splitter |
| 32b | jumper cables |
| 32c | de power jumper cabling |
| 50 | vertical connectivity cabling structures |
| 50a | cable |
| 50b | cable |
| 50c | dc power cabling |
| 70 | equipment |
| 70a | HMFOC fiber splice cable |
| 70b | splice closure |
| 70c | power supply cabling |
| 70d | HMFOC fanout cabling |
| 70e | demarcation box |
| 70f | HMFOC hardened fanout |
| 70g | hardened pretermination box |
| 90 | fiber backhaul |
| 92 | rectifier |
| 100 | first topology arrangement |
| 102 | AC street light wiring |
| 200 | second topology arrangement |
| 202 | AC street light wiring |
| 300 | third topology arrangement |
| 302 | AC street light wiring |

The invention claimed is:

1. A smart pole assembly comprising:
a pole structure having a hollow interior;
a light fixture supported by the pole structure;
at least one vertical cabling structure extending through the hollow interior of the pole structure, the at least one vertical cabling structure being connectorized at each end;
a data-communications module supported by the pole structure and receiving the at least one vertical cabling structure, wherein the data-communications module includes at least one data-communication equipment component; and
at least one quick-disconnect jumper cable removably connecting the at least one data-communication equipment component with the at least one vertical cabling structure.

2. The smart pole assembly of claim 1, wherein the at least one vertical cabling structure includes fiber optic cables.

3. The smart pole assembly of claim 2, wherein the fiber optic cables are terminated with hardened multi-fiber optical connectors at each end.

4. The smart pole assembly of claim 1, wherein the data-communications module includes one or both of a metro cell and a wireless transceiver.

5. The smart pole assembly of claim 1, wherein the at least one vertical cabling structure includes a connectorized DC power cable.

6. The smart pole assembly of claim 1, wherein the at least one vertical cabling structure includes a connectorized Category 6 cable.

7. A smart pole assembly comprising:
a pole structure having a hollow interior;
a light fixture supported by the pole structure;
a vertical cabling harness extending through the hollow interior of the pole structure, the vertical cabling harness being connectorized at each end;
a data-communications module supported by the pole structure and receiving the vertical cabling harness;
at least one data-communications component supported by or within the data communications module; and a quick-disconnect jumper cable connecting the vertical cabling harness to the at least one data-communications component, the quick-disconnect jumper cable comprising at least one first connector removably connected to the vertical cabling harness and at least one second connector removably connected to the at least one data-communications component.

8. The smart pole assembly of claim 7, wherein the vertical cabling harness includes fiber optic cables.

9. The smart pole assembly of claim 8, wherein the fiber optic cables are terminated with hardened multi-fiber optical connectors at each end.

10. The smart pole assembly of claim 7, wherein the vertical cabling harness includes a connectorized DC power cable.

11. The smart pole assembly of claim 7, wherein the vertical cabling harness includes a connectorized Category 6 cable.

12. The smart pole assembly of claim 7, wherein the at least one data-communications component includes one or both of a metro cell and a wireless transceiver.

13. A smart pole assembly network comprising:
a plurality of smart pole assemblies, each smart pole assembly comprising:
a pole structure having a hollow interior;
a light fixture supported by the pole structure;
at least one vertical cabling structure extending through the hollow interior of the pole structure, the at least one cabling structure being connectorized at each end;
a data-communications module supported by the pole structure and receiving the at least one vertical cabling structure; and
an AC to DC rectifier connected to power cabling of the at least one vertical cabling structure.

14. The smart pole assembly network of claim 13, further including a fiber backhaul to which the at least one vertical cabling structure of each of the plurality of smart poles is connected.

15. The smart pole assembly network of claim 13, wherein at least one of the plurality of smart pole assemblies includes a metro cell radio/antenna station.

16. The smart pole assembly network of claim 13, wherein the at least one vertical cabling structure includes one or more of connectorized fiber optic cables, DC power cables, and connectorized Category 6 cables.

17. The smart pole assembly network of claim 16, wherein the fiber optic cables are terminated with hardened multi-fiber optical connectors at each end.

18. A smart pole assembly comprising:
a pole structure having a hollow interior;
a light fixture supported by the pole structure;
at least one vertical cabling structure extending through the hollow interior of the pole structure, the at least one vertical cabling structure being connectorized at each end and including at least one connectorized fiber optic cable and at least one connectorized DC power cable;
a data-communications module supported by the pole structure and receiving the at least one vertical cabling structure, wherein the data-communications module includes one or both of a metro cell and a wireless transceiver; and
at least one quick-disconnect jumper cable removably connecting the one or both of the metro cell and the wireless transceiver with the at least one vertical cabling structure, the at least one quick-disconnect jumper cable comprising at least one first connector removably connected to the at least one vertical cabling structure and at least one second connector removably connected to the one or both of the metro cell and the wireless transceiver.

19. The smart pole assembly of claim 18, wherein the fiber optic cables are terminated with hardened multi-fiber optical connectors at each end.

20. The smart pole assembly of claim 18, wherein the at least one vertical cabling structure includes a connectorized Category 6 cable.

\* \* \* \* \*